United States Patent
Ebeling

(10) Patent No.: US 7,254,691 B1
(45) Date of Patent: Aug. 7, 2007

(54) QUEUING AND ALIGNING DATA

(75) Inventor: Christopher D. Ebeling, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 335 days.

(21) Appl. No.: 11/072,106

(22) Filed: Mar. 4, 2005

(51) Int. Cl.
*G06F 12/00* (2006.01)

(52) U.S. Cl. .................. 711/202; 711/103; 711/104; 711/154; 711/158; 341/100; 341/101; 365/194

(58) Field of Classification Search ............. 711/202, 711/103, 104, 154, 158; 341/100, 101; 365/194
See application file for complete search history.

(56) References Cited

U.S. PATENT DOCUMENTS

| | | | | |
|---|---|---|---|---|
| 5,057,837 A | * | 10/1991 | Colwell et al. ............. | 341/55 |
| 5,179,680 A | * | 1/1993 | Colwell et al. ............. | 711/125 |
| 5,574,849 A | * | 11/1996 | Sonnier et al. ............. | 714/12 |
| 5,867,501 A | * | 2/1999 | Horst et al. ............... | 370/474 |
| 5,914,953 A | * | 6/1999 | Krause et al. ............. | 370/392 |
| 6,157,967 A | * | 12/2000 | Horst et al. ............... | 710/19 |
| 6,181,609 B1 | * | 1/2001 | Muraoka .................. | 365/189.05 |
| 6,237,122 B1 | * | 5/2001 | Maki ........................ | 714/730 |
| 6,594,752 B1 | * | 7/2003 | Baxter ...................... | 712/43 |
| 6,961,842 B2 | * | 11/2005 | Baxter ...................... | 712/43 |
| 6,985,096 B1 | * | 1/2006 | Sasaki et al. ............. | 341/100 |
| 7,187,200 B2 | * | 3/2007 | Young ...................... | 326/41 |

OTHER PUBLICATIONS

U.S. Appl. No. 10/919,900, filed Aug. 17 2004, Sasaki.
U.S. Appl. No. 10/683,944, filed Oct. 10, 2003, Young.

* cited by examiner

*Primary Examiner*—Stephen C. Elmore
(74) *Attorney, Agent, or Firm*—W. Eric Webostad

(57) ABSTRACT

Queuing and ordering data is described. Data is stored or queued in concatenated memories where each of the memories has a respective set of data out ports. An aligner having multiplexers arranged in a lane sequence are coupled to each set of the data out ports. A virtual-to-physical address translator is configured to translate a virtual address to provide physical addresses and select signals, where the physical addresses are locations of at least a portion of data words of a cell stored in the concatenated memories in successive order. The multiplexers are coupled to receive the select signals as control select signaling to align the at least one data word obtained from each of the concatenated memories for lane aligned output from the aligner.

20 Claims, 9 Drawing Sheets

QUEUING AND ALIGNING DATA

FIELD OF THE INVENTION

One or more aspects of the invention relate generally to aligning data and, more particularly, to queuing and aligning data.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external programmable read only memory ("PROM") or written into the FPGA by an external device. The collective states of the individual memory cells then determine the function of the FPGA.

Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In some CPLDs, configuration data is stored on-chip in non-volatile memory. In other CPLDs, configuration data is stored on-chip in non-volatile memory, then downloaded to volatile memory as part of an initial configuration sequence.

For all of these PLDs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include these exemplary devices, as well as encompassing devices that are only partially programmable An incoming information stream ("data stream"), which may include control information and data, to an FPGA may be at a data rate that is higher than that which may be processed by FPGA programmable circuitry ("FPGA fabric"). The FPGA fabric can include block random access memories (BRAMs), that are dual ported memory blocks, such as those found in the Virtex II FPGA chip from Xilinx, Inc. of San Jose, Calif. For example, for a high-bandwidth application, memory read or write cycle time of BRAMs of FPGA fabric may be insufficient to process each incoming word of a data stream sequentially. To address this imbalance between data rate of an incoming data stream and data rate which may be handled by BRAMs, one may write and read multiple words of the data stream into and out of BRAMs configured to be N words wide, for N a positive integer.

Conventionally, multi-word data is written to and retrieved from N word wide queues. Accessing N words at a time from the same physical address is known as single address pointer access. BRAMs of an FPGA may be configured to provide one or more circular queues to receive an incoming data stream. However, configuring BRAMs as a circular queue with a width of N words has a drawback when a packet or cell boundary is not an integer multiple of integer N. In reads or writes, where a packet or cell boundary is not an integer multiple of integer N, a starting point ("word zero") of a packet or cell may appear in any of N possible word locations of such a memory configuration. In other words, a packet or cell word zero may not be aligned to a physical address boundary. Because a packet or cell starting point may be in any of the N possible word locations, this randomness complicates reconstruction of a packet or a cell.

Others have addressed this data alignment issue by implementing what is known as "barrel shifting." However, implementing a barrel shifter in an FPGA may consume a significant amount of resources and power.

Accordingly, it would be desirable and useful to provide means by which packets or cells may be accessed where a first word of a retrieved packet or cell appears in a same location regardless of where such word originated in a physical memory space.

SUMMARY OF THE INVENTION

One or more aspects of the invention relate generally to aligning data and more particularly to queuing and aligning data.

An aspect of the invention is a method for queuing and ordering data, including: receiving a set of bits (for example, a cell) at a first data rate; interrogating the set of bits at a second data rate slower than the first data rate, where the set of bits is interrogated to obtain data information for the set of bits; generating physical addresses for storing data obtained from the set of bits; storing the data from the set of bits in memory responsive to the physical addresses, where the storing includes writing multiple words during a write operation; creating a record of the data information for the set of bits, the record including a virtual address associated with a starting location of the physical addresses; retrieving the record to read the data stored in the memory; translating the record to provide the physical addresses for accessing the data stored in the memory and to provide select signals; reading the data stored in the memory responsive to the physical addresses provided from translating the record; and aligning the data accessed from the memory, the data aligned responsive to the select signals.

Another aspect of the invention is an integrated circuit for queuing and ordering data, including: a serializer-deserializer configured to receive a serial stream of information at a first data rate and configured to convert the serial stream of information to parallel streams of information at a second data rate slower than the first data rate; a pre-processor coupled to receive the parallel streams of information and configured to interrogate the parallel streams of information to locate an initial data word of a cell and to obtain information on size of the cell, where the pre-processor is configured to generate a physical address responsive to the initial data word location and to generate a virtual address responsive to the physical address and a slot index, the slot index indicating an memory unit in which the initial data word is to be stored; a memory coupled to receive the parallel streams of information and the physical address associated therewith for storage of cell data, where the memory includes concatenated memory blocks such that the physical address associated with the memory unit being a respective one of the concatenated memory blocks; a pointer circuit coupled to receive the virtual address and the information on size of the cell from the pre-processor and configured to create record thereof, where the physical address for the initial data word is associated with a row of the concatenated memory blocks; a translator coupled to retrieve the record and configured to generate: physical addresses responsive to the virtual address and the information on size of the cell obtained from the record retrieved, and select signals associated with the concatenated memory blocks responsive to the slot index and successive increments thereof responsive to the information on size of the cell; and an aligner coupled to receive the cell data read from the memory responsive to the physical addresses and coupled to receive the select signals, the aligner configured to provide lane alignment of the cell data read responsive to the select signals.

An integrated circuit for aligning data, including: memories, where each of the memories has a respective set of data out ports; an aligner having multiplexers arranged in a lane sequence, where the multiplexers are coupled to each set of the data out ports of the memories to receive at least one data word from each of the memories associated with a cell having data words; and a virtual-to-physical address translator coupled to the memories and to the aligner and configured to translate a virtual address to provide physical addresses and select signals, where the physical addresses are locations of at least a portion of the data words of the cell stored in the memories in successive order. The virtual-to-physical address translator is configured to generate the select signals responsive to a memory index in the virtual address, where the memory index is associated with a memory of the memories having stored therein a first data word of the data words of the cell. The virtual address includes a physical address of the first data word of the cell stored in the memory. The multiplexers are coupled to receive the select signals as control select signaling to align the at least one data word obtained from each of the memories for lane aligned output from the aligner, where the first data word is output from a multiplexer of the multiplexers associated with an initial lane of the lane sequence.

BRIEF DESCRIPTION OF THE DRAWINGS

Accompanying drawing(s) showing exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different. Moreover, for purposes of clarity, a single signal or multiple signals may be referred to or illustratively shown as a signal to avoid encumbering the description with multiple signal lines. Moreover, along those same lines, a multiplexer or a register, among other circuit elements, may be referred to or illustratively shown as a single multiplexer or a single register though such reference or illustration may be representing multiples thereof. Furthermore, though particular signal bit widths, data rates, and frequencies are described herein for purposes of clarity by way of example, it should be understood that the scope of the description is not limited to these particular numerical examples as other values may be used.

From the description that follows, it will become apparent that post processing of an incoming data stream is simplified by providing a capability to access any starting word, as well as subsequent words, from stored multiple-word data using a virtual memory space aligned to cell or packet boundaries. Moreover, this may be used where storage, and thus access thereof, of multi-word data spans more than one physical address.

Figure 1A:
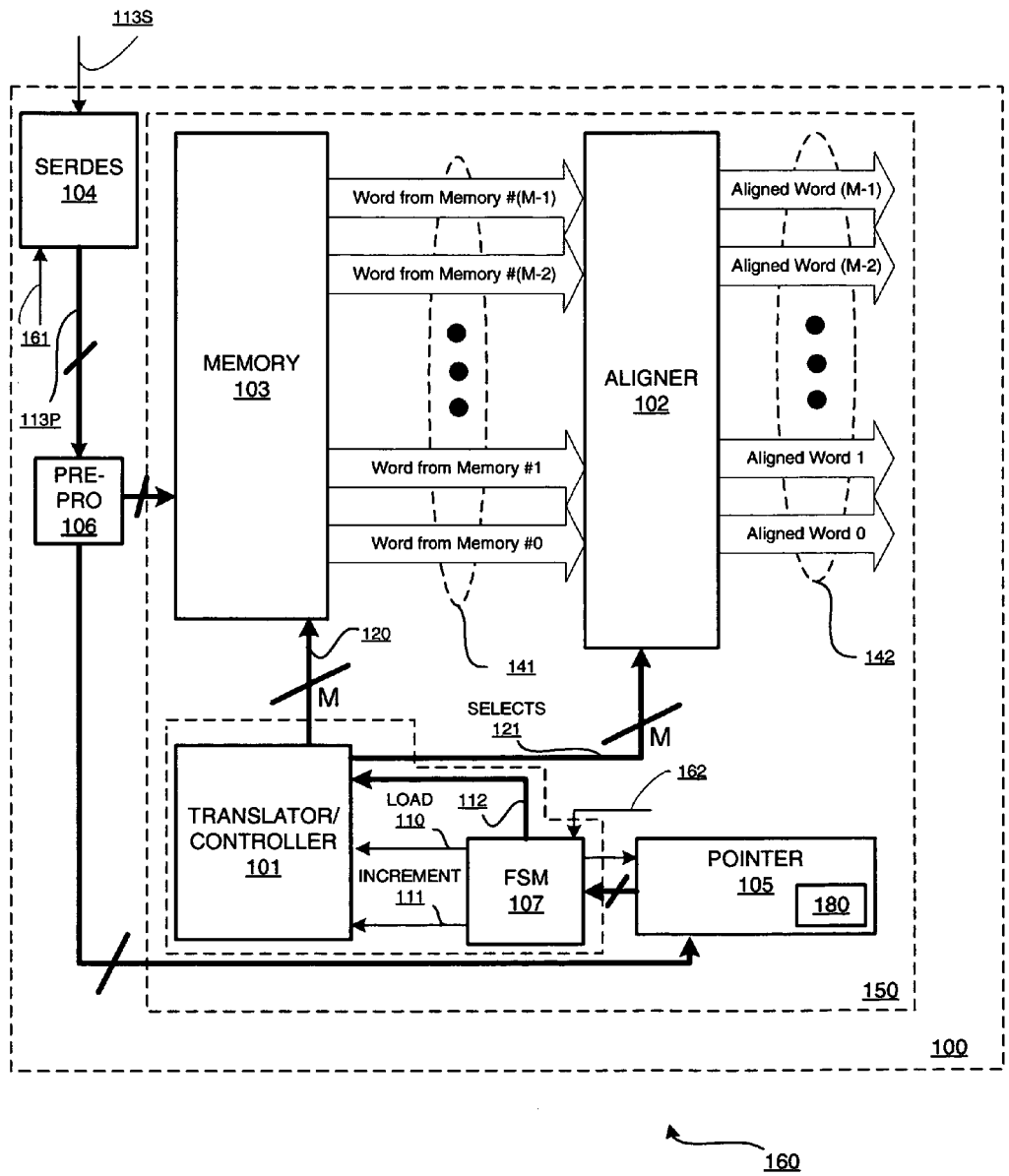
FIG. 1A is a high-level block diagram depicting an exemplary embodiment of a queuing and alignment system.

FIG. 1A is a high-level block diagram depicting an exemplary embodiment of a queuing and alignment system ("system") 100. System 100 may be located in an FPGA 160 where an incoming serial data stream 113S is received at a data rate faster than can be processed by FPGA fabric 150 in which system 100 is located. Notably, configurable logic, dedicated logic, or a combination of dedicated and configurable logic may be used to provide system 100. Thus, it should be appreciated that memory 103, aligner 102, translator/controller 101, finite state machine ("FSM") 107, and pointer logic ("POINTER") 105 may operate in a clock domain of clock signal 162, which in one embodiment is asynchronous to clock signal 161. In an alternative embodiment clock signal 162 can be synchronous with clock signal 161.

Incoming data stream 113S is converted by a serializer-deserializer ("SERDES") 104 from a serial data stream 113S to parallel data streams 113P. SERDES 104 is configured to operate at a clock rate of incoming data stream 113S and to output parallel data streams 113P at a clock rate of clock signal 161 which is slower than the clock rate of incoming data stream 113S. An example of a SERDES in an FPGA that may be used is described in additional detail in a patent application entitled "Bimodal Serial to Parallel Converter with Bitslip Controller", by Paul T. Sasaki et al., Ser. No. 10/919,900, filed Aug. 17, 2004, now U.S. Pat. No. 6,985,096. Notably, incoming data stream 113S may be provided with a forwarded clock signal to provide a source synchronous interface, as is known.

For purposes of clarity by way of example and not limitation, numerical examples shall be used. However, it should be understood that other values than those used herein may be employed.

It shall be assumed that incoming serial data stream 113S is approximately 500 MHz double-data rate ("DDR") signal, and it shall be assumed that FPGA fabric 150 operates at approximately one quarter the data rate of an incoming data stream 113S. Accordingly, for each clock cycle of clock signal 161, four words of incoming data stream 113S may be written from parallel data streams 113P into memory 103.

Parallel data streams 113P are provided to pre-processor 106. Pre-processor 106 provides data from parallel data streams 113P to memory 103 along with information as to where in memory 103 such data is to be written. For example, data may be part of a cell. A cell is a set or group of bits and may be any of a packet, a frame, a sub-packet, or a sub-frame. The type of information provided is format dependent. Thus, pre-processor 106 extracts from a cell a starting location of the data to be written to memory 103 and a size of the cell data. It should be appreciated that cell size may be greater than memory width. The physical address as to where the cell data is to start being written to memory, along with the starting memory unit, is provided from pre-processor 106 to memory 103 along with the cell data. As shall be more clearly understood from the description that follows, the physical address of a starting word of cell data and the memory unit is used to provide a virtual address, and this virtual address along with cell size is provided from pre-processor 106 to pointer 105 to be stored as a record in record array 180 of pointer 105.

Memory 103 is configured with M memory units, where each memory unit may be $2^N$ deep, for M and N positive integers. Each memory unit may be one or more words wide. For purposes of illustration and not limitation, it shall be assumed that M is equal to four and that N is equal to 10. Furthermore, it shall be assumed, for purposes of illustration, in one exemplary embodiment of the present invention, that each memory unit is a block memory unit, such as BRAM, of an FPGA. However, in other embodiments of the present invention each memory unit can be any discrete memory unit in any type of integrated circuit. Notably, because of control overhead, for example such as cell start point ("SP") and cell end point ("EP") control words, it may be useful to include additional BRAMs in memory 103. Moreover, it may be desirable to write more than four words at a time, and thus additional BRAMs or wider BRAMs may be used. However, for purposes of illustration and not limitation, it shall be assumed that the physical address space in this example is four words wide and approximately 1024 words deep, where each BRAM is one word wide. Moreover, though BRAM is used in this example, it should be understood that distributed memory, such as distributed RAM, may be used.

For example, a record in record array 180 may be physical addresses in memory 103 for a SP and an EP of a cell as determined by pre-processor 106.

Figure 1B:
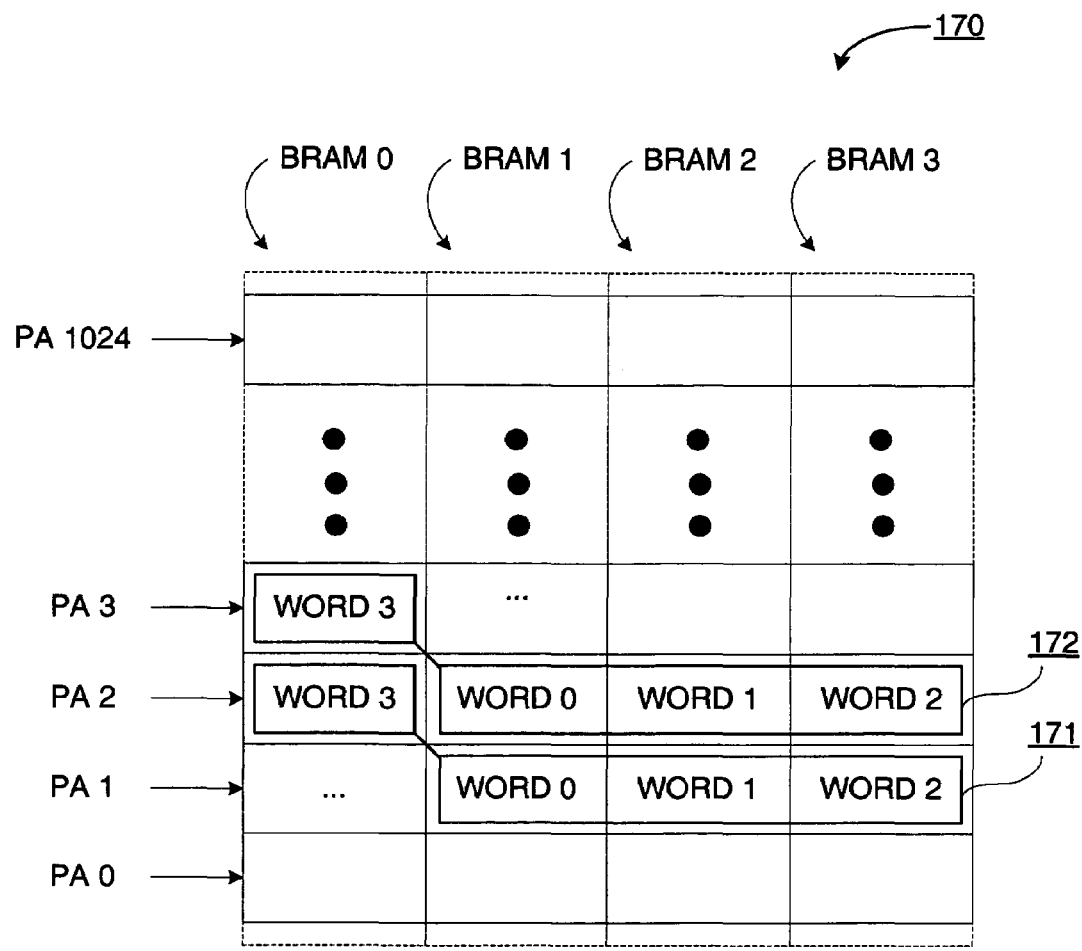
FIG. 1B is a high-level block diagram depicting an exemplary embodiment of a memory array for the queuing and alignment system of FIG. 1A.

FIG. 1B is a high-level block diagram depicting an exemplary embodiment of a memory array 170 for the above-mentioned example. Memory array 170 may be part of or separate from memory 103 of FIG. 1A. However, for purposes of clarity, it shall be assumed that memory array 170 is part of memory 103. Four memory units are indicated as BRAMs 0 through 3, where each BRAM has 1024 rows. Concatenating BRAMs 0 through 3, each physical address ("PA") is four words wide. In addition to BRAMs 0 through 3 forming a physical address space for memory array 170, other memory units may be used to provide a physical address space.

Again, each BRAM may be more than one word wide. For example, a BRAM may be two words wide, in which implementation indexing may be to the first and second word stored in a BRAM. However, for purposes of illustration and not limitation, it shall be assumed that each BRAM is one word wide.

In the example, cell 171 stored in memory array 170 occupies a portion of two physical address spaces, namely a portion of a physical address space associated with PA 1 and a portion of a physical address space associated with PA 2. Both a PA for a starting location of a cell, as well as an index indicating where within the PA a cell starts, namely which memory unit, may be used for accessing a cell. In this example, the notation Word 0 is used to indicate a control or starting word of cell 171. Notably, for this example, depending in which BRAM Word 0 is written will affect whether one or two PAs are used for cell 171.

Figure 1C:
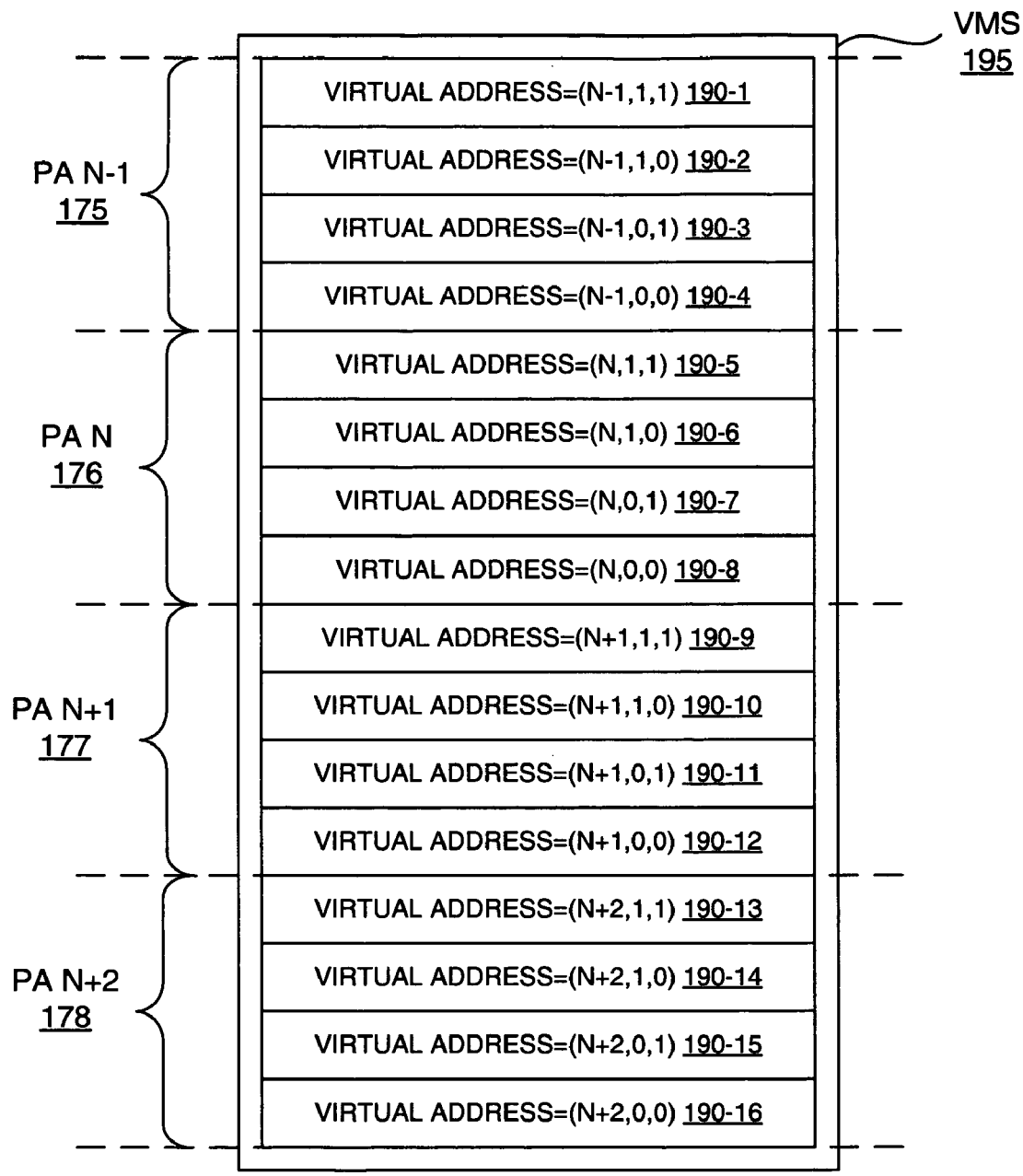
FIG. 1C is a block diagram depicting an exemplary embodiment of virtual-to-physical memory mapping.

FIG. 1C is a block diagram depicting an exemplary embodiment of virtual memory space 195. Continuing the above example of four BRAMs, a virtual-to-physical memory mapping ratio of four is used, though other ratios may be employed.

Example physical addresses, PA N−1 175, PA N 176, PA N+1 177, and PA N+2 178, each may have one of four respective virtual addresses associated therewith, namely virtual addresses 190-1 through 190-4, 190-5 through 190-8, 190-9 through 190-12, and 190-13 through 190-16, respectively, depending on the location of a starting word of a cell. For the example, if a starting word of a cell is stored in slot 1 at PA N 176, then virtual address 190-7 is generated by pre-processor 106 of FIG. 1A, where (0,1) indicates slot 1. Notably, start of cell sequences are conventionally used to indicate a starting location, which may be detected by pre-processor 106 to identify a starting word of a cell. Pre-processor 106 may be configured to concatenate the physical address with a slot address to provide a virtual address for each starting word, where the slot address is associated with a memory in which the starting word is stored.

Each virtual address pointer includes a physical address and a slot index. Notably, the physical address is sequentially incremented ("pushed") if a cell spans more than one physical address. For the example of M equal to four, then Q may equal two, namely the two least significant bits ("LSBs") of each virtual address in this example. Notably, ordering of bits may vary from application to application. For example, most significant bits may be used. However, for purposes of illustration by way of example, it shall be assumed that LSBs are used though other bit orders may be used. Thus, for example bits 00 may correspond to BRAM 0 ("slot 0"). For example, for virtual addresses 190-5 through 190-8, the physical address value for each is N, each corresponding to PA N 176, and the slot value for each is two bits, one set for each slot, namely (0,0) for slot 0, (0,1) for slot 1, (1,0) for slot 2, and (1,1) for slot 3 in this example.

With simultaneous reference to FIGS. 1A through 1C, virtual-to-physical mapping is further described. Notably, for writing to memory array 170, words may be written in groups of four words at a time to successive available slots in the current example. Notably, where data streams 113P begin writing to memory array 170 may be in any of slots 0 through 3. For reading from memory array 170, virtual addresses are used to provide for four concurrent reads at a time in the instant example responsive to a virtual address pointer pointing to a first word of a cell stored in at a physical address in memory 103 and successive increments thereafter for subsequent data cells. For a "full bandwidth" system, there is little or no "dead" space, and thus the number of words written at a time generally equals the number of words read at a time. Of course, less than a full bandwidth implementation may be used.

Figure 1D:
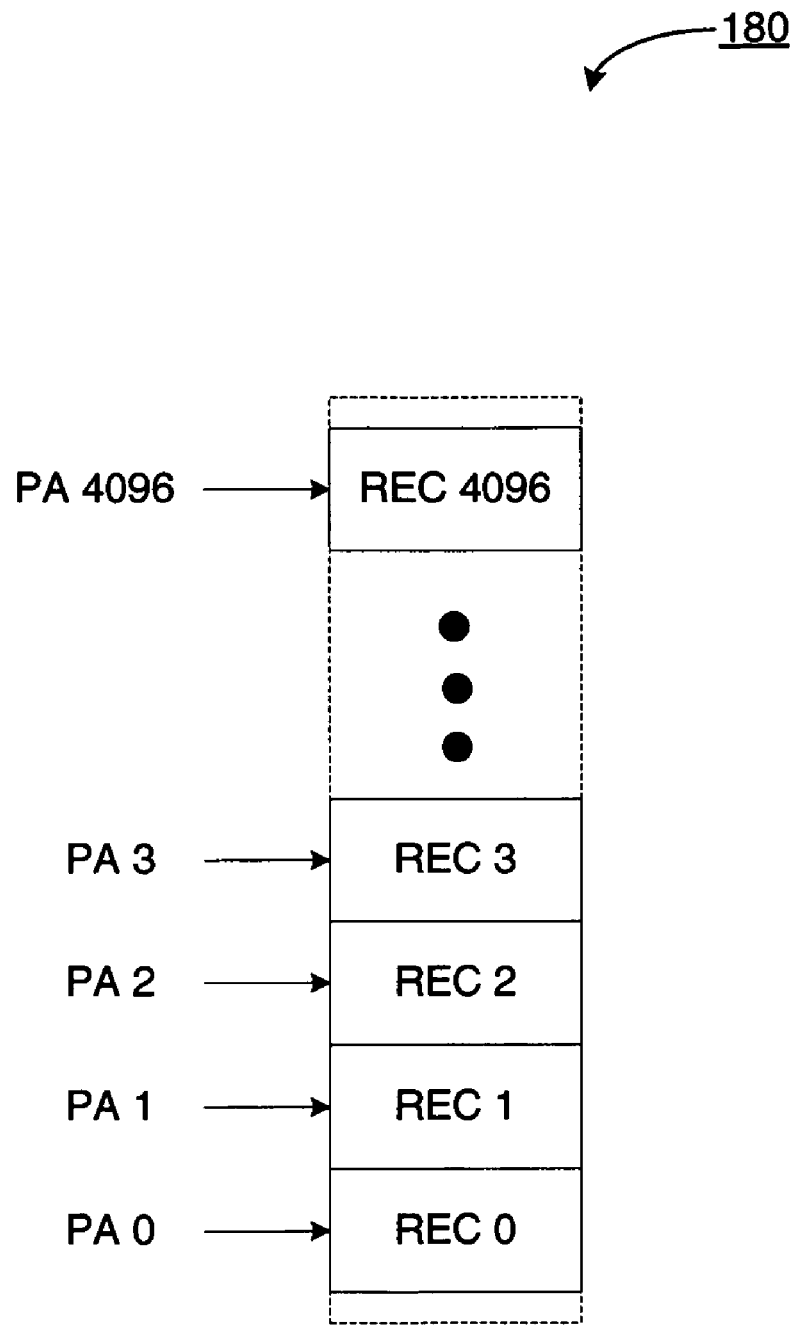
FIG. 1D is a high-level block diagram depicting an exemplary embodiment of a storage array for the queuing and alignment system of FIG. 1A.

FIG. 1D is a high-level block diagram depicting an exemplary embodiment of a record array 180. Record array 180 may be part of or separate from pointer 105 of FIG. 1A. Continuing the above-example, record array 180 may be implemented as a first-in, first-out buffer ("FIFO") for a virtual address space for queuing virtual address pointers. Alternatively, a BRAM or a circular queue may be used to provide a record array 180. Record array 180 may have a depth that is M times $2^N$. Width of record array 180 is sufficient for storing a pointer, such as pointer 190-1 of FIG. 1C for example, along with cell size, for example four words, which make up a record ("REC"), such as any of records 0 through 4096 in this example. Again, other record formats may be used.

Figure 2:
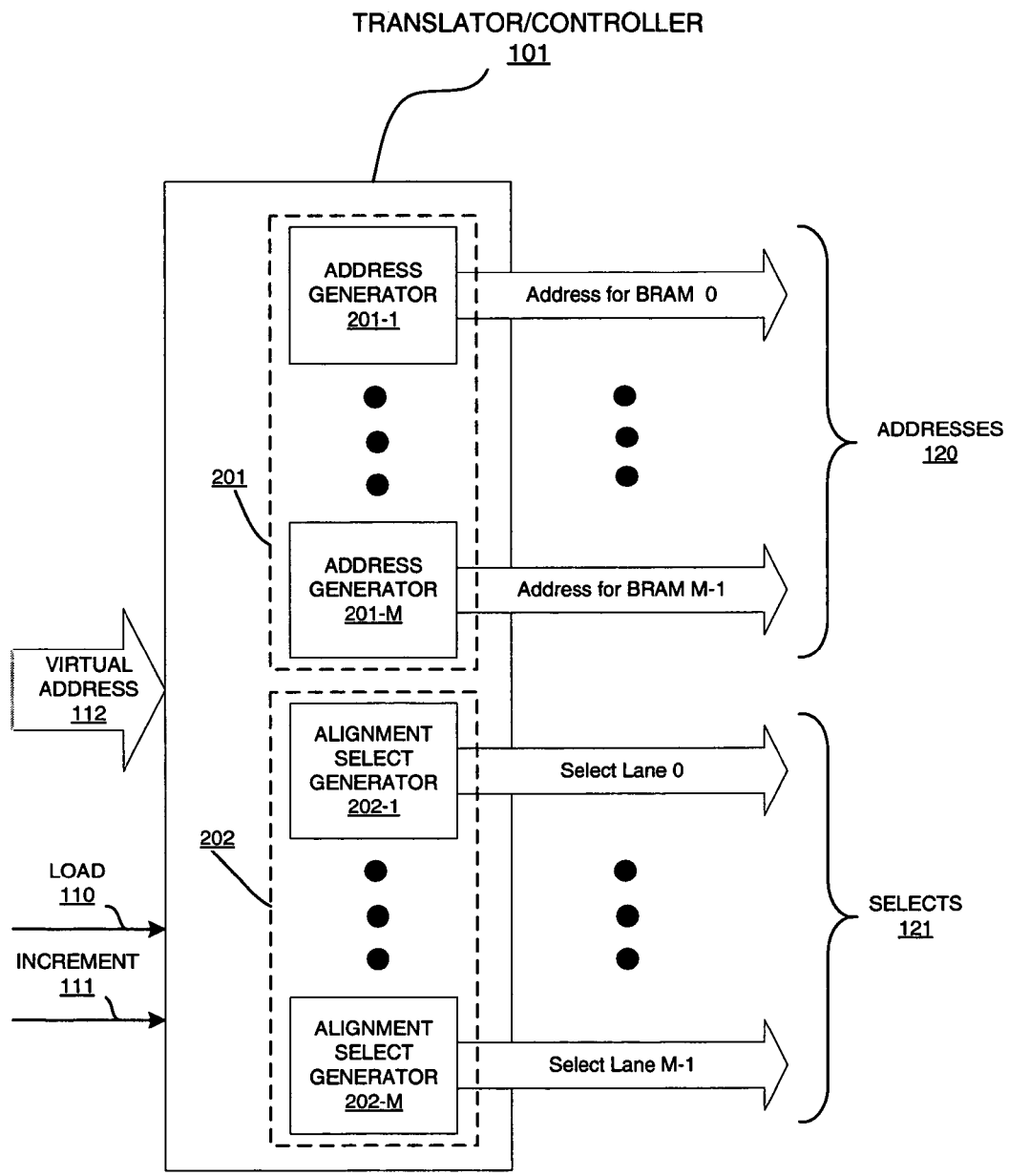
FIG. 2 is a high-level block diagram depicting an exemplary embodiment of translator/controller.

FIG. 2 is a high-level block diagram depicting an exemplary embodiment of translator/controller 101 of FIG. 1A. Translator/controller 101 is a virtual address translator/controller. Translator/controller 101 includes address generators 201 and alignment select generators 202. For M a positive integer, translator/controller 101 is configured to generate M address signals ("addresses") 120 and M select control signals ("selects") 121 respectively by address generators 201-1 through 201-M and alignment select generators 202-1 through 202-M.

Addresses 120 may include respective addresses for BRAM 0 through BRAM M−1. Selects 121 may include respective selects for Lane 0 through Lane M−1. Addresses 120 and selects 121 are generated respectively by generators 201 and 202 responsive to inputs, including a virtual address signal 112, a load signal 110, and an increment signal 111.

A virtual address may be described by a set of values, (P, S), where P and S are positive integers, respectively such as a value for a row pointer and a value for a column pointer of virtual address signal 112. A value X, in binary format, is for bit width. The value X is equal to the sum of N and S. Again, depth of each BRAM is $2^N$, as N bits are used to access memory contents. Moreover, M is equal to or greater than $2^S$, which is the number of words that may be accessed in single read operation.

With simultaneous reference to FIGS. 1A through 1D and FIG. 2, system 100 is further described. Address generation by a generator of generators 201 is responsive to either load signal 110 or increment signal 111, depending on which operation is being done. Moreover, address generation by a generator of generators 201 is responsive to the value of P ("row pointer") and the value of S ("column pointer") of virtual address signal 112. Recall from the example, for successive reads are done at a time to read four words, such as Words 0 through 3 of a cell 171. For an initial set of successive reads, load signal 110 is asserted. However, recall that cell size may be wider than memory width. Thus, for example if a cell spans more than four words in the current example, a physical address is incremented for the next set of successive reads. Thus, for example, to read the next part of a cell, namely a sub-cell 172 where a sub-cell 171 in combination with sub-cell 172 form at least part of a cell, increment signal 111 is asserted. Notably, as all cell data is successively written in memory 103, by successively asserting increment signal 111 until the entire cell size is spanned by sets of successive reads, only one virtual address pointer may be used to access all cell data, even if such cell data is wider than memory width of memory 103.

Select generation by a generator of generators 202 is responsive to load signal 110, as well as the value of S of virtual address signal 112. Thus, for example, a row pointer indicates a PA, such as a PA of PAs 0 through 1024, and a column pointer indicates a BRAM, such as a BRAM of BRAMs 0 through 3. Select generators 202-1 through 202-M are responsive to the column pointer. Notably, once a load signal 110 is asserted, select signals 121 will not change for subsequent assertions of increment signal 111, if any, prior to assertion of another load signal. For example, in FIG. 1B, Words 0 through 3 of a sub-cell 171 are in the same BRAMs as their counter part Words 0 through 3 of sub-cell 172, and thus word/slot association does not change responsive to assertion of increment signal 111. However, word/slot association may change responsive to assertion of a subsequent load signal 110 and a subsequent virtual address signal 112 to load another data cell to be read.

For a read of a data cell, a record for the read is obtained from record array 180 by pointer 105. This reading may be done responsive to clock signal 162 for sequentially reading each record in record array 180. From record array 180, a virtual address for the read is obtained. This virtual address obtained is provided from pointer 105 to FSM 107 to generate load signal 110. Notably, FSM 107 may be part of translator/controller 101, but is separated out here for purposes of illustration. Also obtained from record array 180 is cell size for the read. Cell sized is provided from pointer 105 to FSM 107. FSM 107 is configured to generate increment signal 111, if any, by dividing cell size by memory width. Also a virtual address signal 112 may be passed from FSM 107 to translator/controller 101.

FSM 107 may be clocked by clock signal 162 for synchronous control of reads of memory 103. Accordingly, FSM 107 may periodically provide a command to pointer 105 to obtain a record in record array 180 for a read of memory 103.

Recall, each virtual address of virtual address signal 112 provided to translator/controller 101 points to a start word of a data cell. Translator/controller responsive to virtual address signal 112 and load signal 110 provides physical addresses 120 to memory 103 for successive reads, for example to read Words 0 through 3 of a cell, and provides select signals 121 to aligner 102. Notably, select signals 121 are all different from one another, as such select signals correspond to slot location for each word read in such successive reads.

Memory 103 in this example has separate read and write ports. Notably, BRAMs may have some cycle latency in which after writing to an input port, a read from an output port may be done along with inspecting virtual address pointers and determining selects.

From memory array 170, words 141 from BRAMs 0 through M−1, namely BRAM 0 through 3 for the example, are respectively provided to aligner 102 for a successive read operation. Data words 141 are provided responsive to M addresses 120 from translator controller 101. Responsive to M selects 121, aligner 102 provides aligned words 142 from read words 141, for example words 0 through M−1 of a cell.

Figure 3:
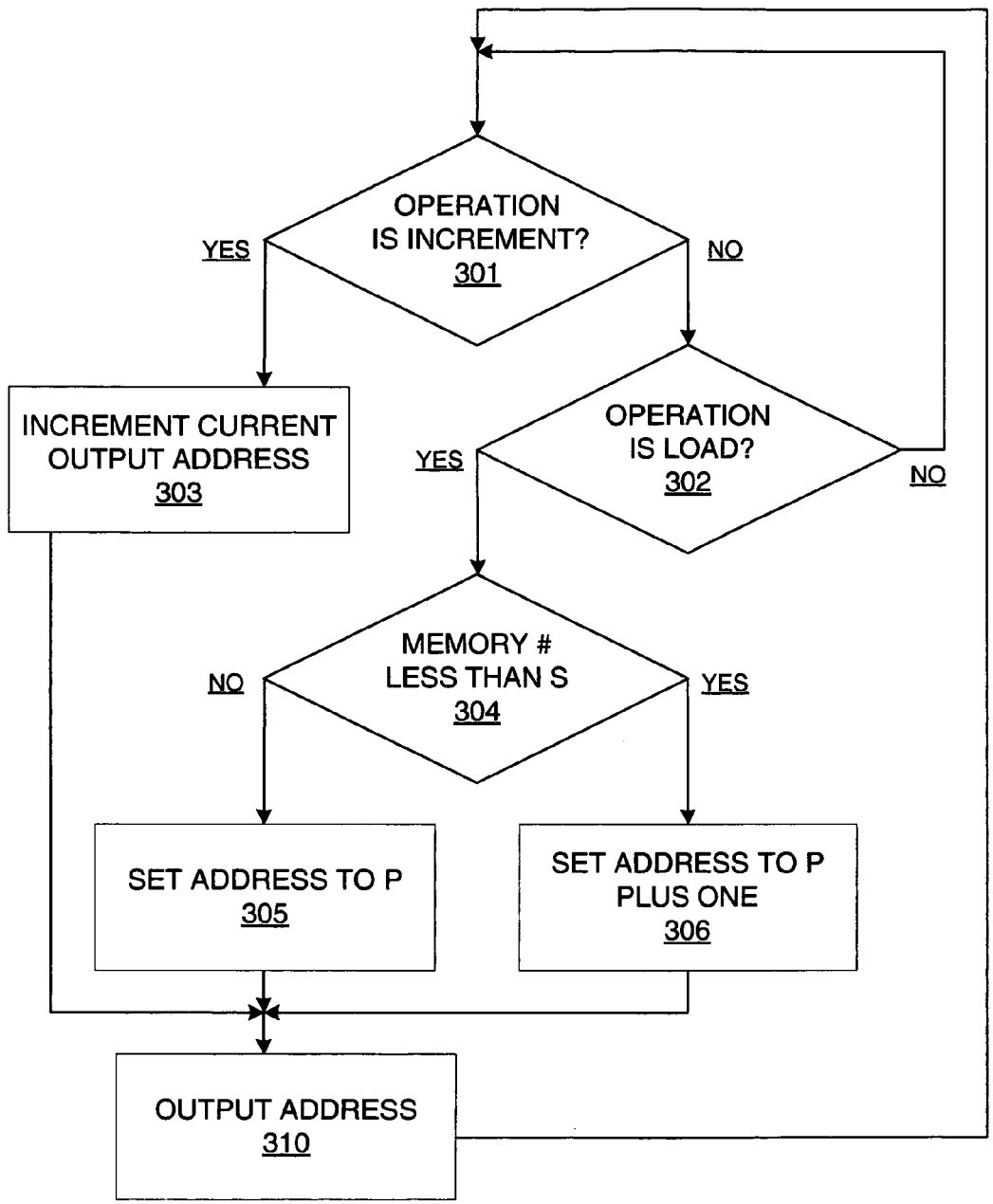
FIG. 3 is a flow diagram depicting an exemplary embodiment of operation of an address generator.

Each address generator 201 generates an address L of addresses 120, where L is for a respective single memory unit, namely L corresponds to one of BRAMs 0 to M−1. With continuing reference to FIGS. 1A through 1D and FIG. 2, and with additional reference to the flow diagram of FIG. 3, in which is depicted an exemplary flow of an embodiment of an address generator 201-M, operation thereof is described.

At 301, it is determined if a command signal is an increment operation, namely if increment signal 111 is asserted. If increment signal 111 is asserted, then at 303 the output value of the current address 310 is incremented by one by address generator 201-M, and at 310 the incremented address is output as an row load address L for addresses 120.

If, however, at 301 it is determined that increment signal 111 is not asserted, then at 302 it is determined if the command operation is a load operation, namely if load signal 110 is asserted. If load signal 110 is asserted, then at 304 it is determined whether a memory number, e.g., BRAM number, associated with virtual address signal 112 is less than S. If S is greater than or equal to the memory number associated with address L, then at 305 address L is set equal to the value of P. In other words, the starting slot for a next set of successive reads is on the same row as the last row read from a previous set of successive reads. Next, at 310, the value of P is output as an initial row load address L of addresses 120. If, however, at 304 it is determined that S is less than the memory number, then at 306 address L associated with the memory number is set equal to the value of P plus one ("P+1"). Then next, at 310, the value of P+1 is output as an initial row address L of memory addresses 120.

From 310 or 302, checking for assertion of a command for an operation from load signal 110 or increment signal 111 may begin again at 301. Accordingly, it should be appreciated that only two row physical addresses L are generated, namely L equal to P and L equal to P+1, where cell word length may be contained within a row of concatenated memories. Notably, if S is equal to zero, then a P+1 address for address L need not be generated.

Though there may only be two physical addresses for P and P+1, M total addresses are generated as each memory unit uses its own physical address. In the example, load and increment signals 110 and 111 may be provided to M loadable counters, where address L is provided as a starting address. Alternatively, rather than using loadable counters, the two physical addresses respectively for the values of P and P+1 may be generated, and an appropriate address for each memory unit may be selected using M multiplexers, where each multiplexer is a two-to-one multiplexer to select as between the two physical addresses. Accordingly, in the alternative embodiment, each multiplexer would have its own select signal, which select signal may be generally expressed as:

$$\text{Select}(M) = (S+M) \bmod (2^Q) \tag{1}$$

where Q is the number of least significant bit(s) of a virtual address.

Figure 4:
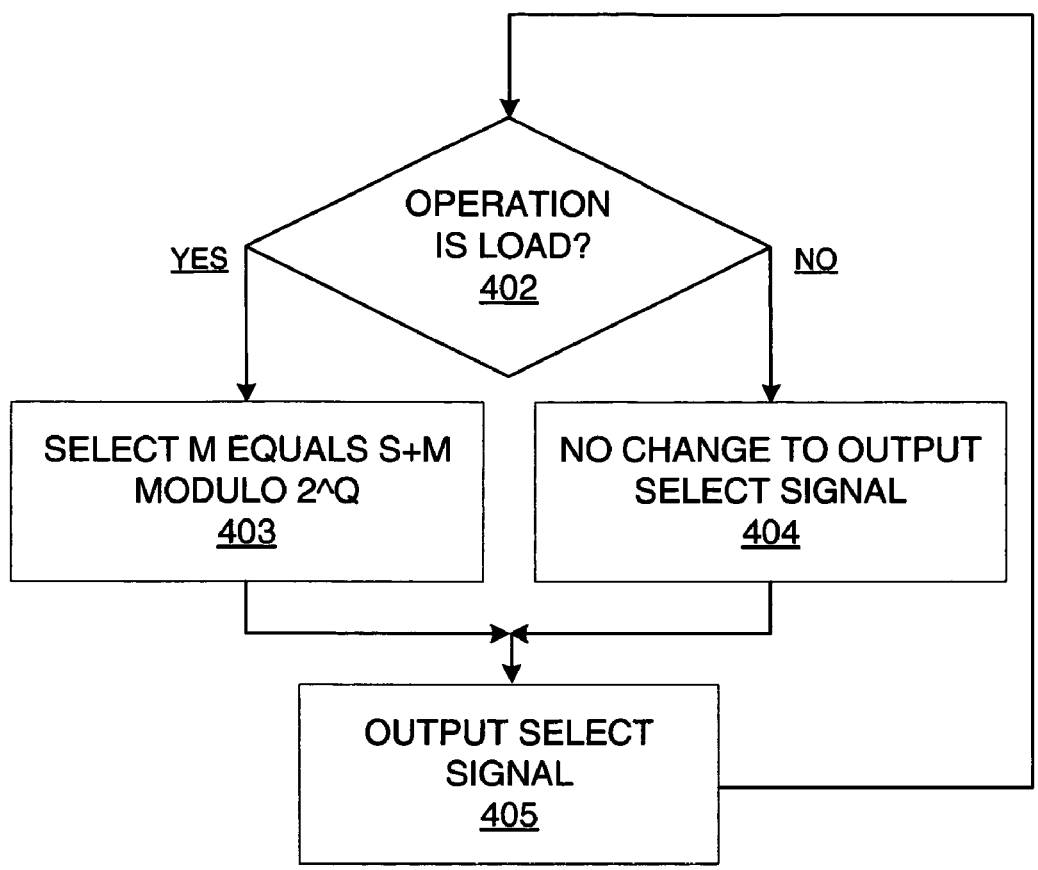
FIG. 4 is a flow diagram depicting an exemplary embodiment of operation of an alignment select generator.

With continuing reference to FIGS. 1A through 1D and FIG. 2, and with additional reference to the flow diagram of FIG. 4, in which is depicted an exemplary flow of an embodiment of an alignment select generator 202-M, operation thereof is described. At 402, it is determined whether a command operation is a load operation, namely whether load signal 110 is asserted. If load signal 110 is asserted, then at 403 a select signal is provided according to Equation (1), and such a select signal is output at 405. If, however, load signal 110 is not asserted, then at 404 there is no change to the select signal output, and at 405 the unchanged select signal is output. From 405, checking for a next load operation may begin again at 402.

Accordingly, it should be appreciated that aligner selects 121 update only responsive to load operations. If an operation is an increment operation, then selects remain at their current state. Determination of a select value for each of M respective aligner multiplexers, described below in additional detail, may use only a modulo($2^Q$) add of the Q least significant bit(s) of a virtual address. Again, other bits may be used.

Figure 5:
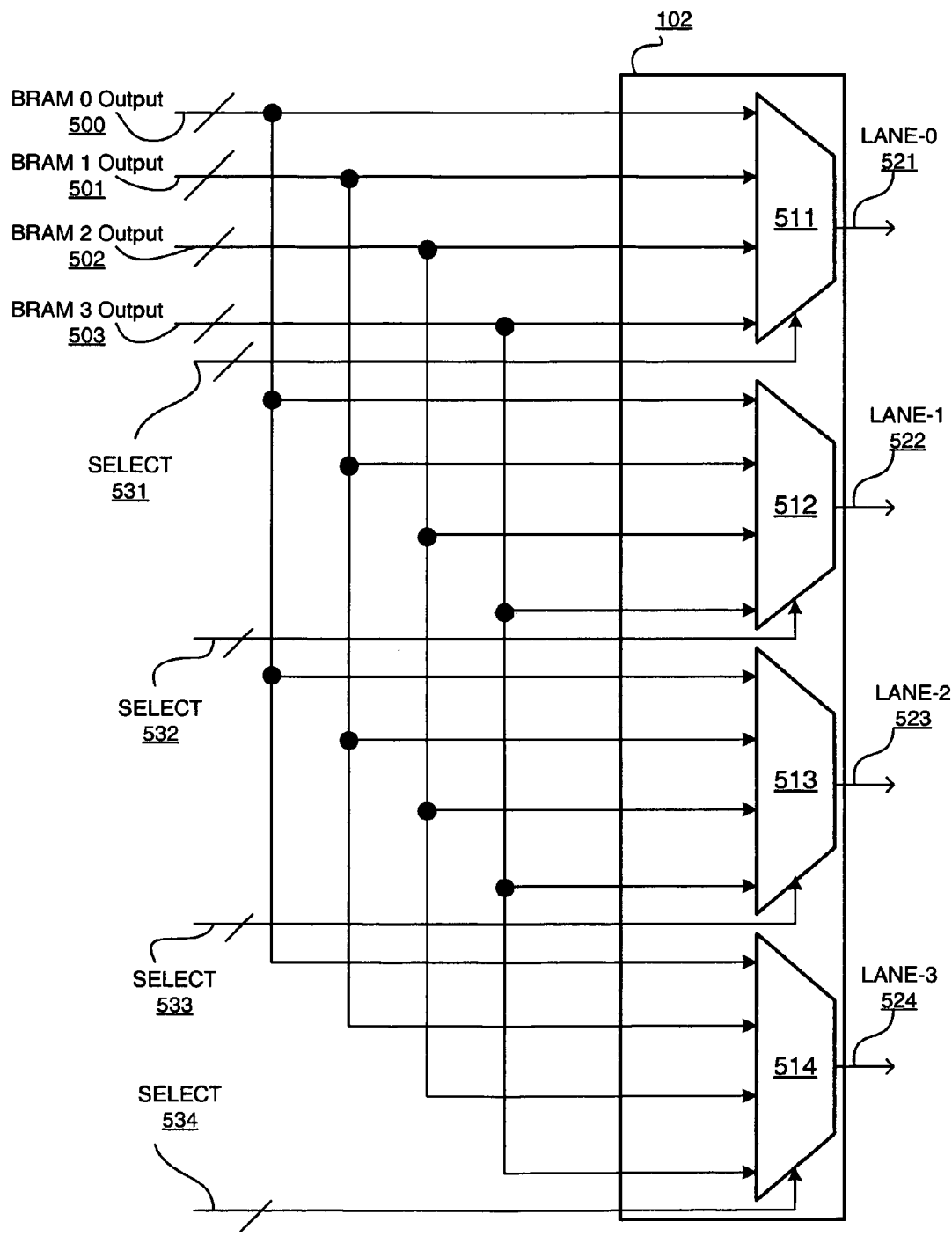
FIG. 5 is a high-level block/schematic diagram depicting an exemplary embodiment of memory coupled to an aligner.

FIG. 5 is a high-level block/schematic diagram depicting BRAM outputs 500 through 503 ("BRAMs 0 through 3"), such as from memory 103 of FIG. 1A, coupled to aligner 102. Aligner 102 includes M multiplexers, where each multiplexer is an M to 1 multiplexer, where M may be obtained from the ratio of virtual address space divided by physical address space.

Continuing the above example, four BRAMs provide four outputs 500 through 503, each of which may be one word wide. These outputs are generally indicated as outputs 141 in FIG. 1A. The set of BRAM outputs 500 through 503 is provided to each of M multiplexers, which in this example are multiplexers 511 through 514. M select signals, namely select signals 531 through 534, are respectively provided to multiplexers 511 through 514, such that each multiplexer receives a select signal. These select signals are generally indicated as selects 121 in FIG. 1A. Notably, for a set of successive reads, select signals 531 through 534 are unique with respect to one another. Again, these select signals 531 through 534 are not changed responsive to assertion of one or more increment signals after assertion of a load signal and prior to assertion of the next load signal.

Thus, it should be understood that in this example multiplexer 511 provides an output 521 for "lane 0," which is the lane for each starting word of a four word cell. Multiplexer 512 provides an output 522 for "lane 1," which is the lane for the first word immediately following the starting word of a four word cell. Multiplexer 513 provides an output 523 for "lane 2," which is the lane for the second word immediately following the starting word of a four word cell. Multiplexer 514 provides an output 524 for "lane 3," which is the lane for the third word immediately following the starting word of a four word cell. For example with continuing reference to FIG. 5 and additional reference to FIG. 1A, to select one of the BRAM output inputs to a multiplexer for output from such multiplexer, a 00 select for a select signal of select signals 121 may be to select BRAM 0 output, a 01 select for a select signal of select signals 121 may be to select BRAM 1 output, a 10 select for a select signal of select signals 121 may be to select BRAM 2 output, and a 11 select for a select signal of select signals 121 may be to select BRAM 3 output.

Thus, in the example of FIGS. 1B and 1C with continuing reference to FIG. 5, select signal 531 to multiplexer 511 may be a 01 to select BRAM 1 output 501 for outputting word 0 onto lane 0; select signal 532 to multiplexer 512 may be a 10 to select BRAM 2 output 502 for outputting word 1 onto lane 1; select signal 533 to multiplexer 513 may be a 11 to select BRAM 3 output 503 for outputting word 2 onto lane 2; and select signal 534 to multiplexer 514 may be a 00 to select BRAM 0 output for outputting word 3 onto lane 3. Accordingly, it should be appreciated that because words of a cell, such as cell 171 of FIG. 1B, are written sequentially across concatenated memories, a starting word may be in any of the concatenated memories. However, select signals are provided such that output, generally indicated as output 142 in FIG. 1A, from multiplexers of an aligner 102, will be aligned irrespective of location of a starting word stored in such concatenated memories for storing a list of words ("multiple list words").

To provide a select signal, a virtual pointer is used. Referring again to FIG. 1C, each virtual address in the virtual address space of a cell is a physical address with a slot address concatenated to the physical address. Notably, where the slot address is concatenated with the physical address may vary, though for purposes of illustration and not limitation in this example the slot address is concatenated to be the two LSBs of the physical address.

Returning to the example of cell 171 of FIG. 1B, there is a virtual address pointer to a starting word of a cell. In the example of a four Word cell, there are four consecutive virtual addresses, including respective slot indices, accessed from a single virtual address pointer pointing to Word 0 of such four Word cell. For example, the four consecutive virtual addresses for cell 171 respectively are (PA 1, 0, 1), (PA 1, 1, 0), (PA 1, 1, 1), and (PA 2, 0, 0). Recall that translator/controller 101 of FIG. 1A is configured to provide M physical addresses 120 for M concurrent reads of memory array 170 of FIG. 1B, and thus any data respectively stored at those physical addresses 120 provided is read out of BRAMs 0 through 3 as Words 0 through 3. Notably, the LSBs of the virtual address pointer to the starting Word 0 are 01 in this example. Thus, the select signal for selecting the starting word for output on lane 0 is these two LSBs, namely, 01. From the select signal for output onto lane 0, each other select signal is incrementally increased. Notably, if, for example, a physical address spans more than one physical address, such as PA 1 and PA 2, the LSBs for selecting word 3 for output are 00. Accordingly, the incrementing in this example is a modulo(2^Q) addition where Q is equal to two, where from 11 the next increment is 00. For Q a relatively small number, rather than implementing multiple adder circuits, lookup table based generation of selects may be used. Accordingly, aligner concurrent reads are self-aligned responsive to a virtual address. In other words, the select signal for lane 0 is always obtained from bits of a virtual address pointer pointing to a starting slot, and each subsequent select can be determined by adding the lane offset to the select modulo Q^2 addition. Notably, depending on location of a starting slot for word 0, as well as cell size and the number of concatenated memories, there may or may not be any look-ahead operation, namely incrementing the physical address, for obtaining stored data.

Accordingly, it should be understood that by providing the capability to access any starting word, and subsequent words thereof of multi-word data, from virtual address space, where such multi-word data is aligned to cell boundaries, complexity of processing such data is reduced. Moreover, this complexity is further reduced as first and subsequent words of a cell appear in the same lanes of multiplexer output for successive sets of reads of data of the cell.

It should further be understood that virtual address space boundaries may be less coarse then physical address space boundaries, where physical address space boundaries are multiple words for each memory row. Thus, a first element of a cell may be accessed where it is stored without having to access memory locations prior to such first element that are not needed for such cell. This facilitates full bandwidth data transfer from memory, as empty or idle memory locations may be skipped over.

Accordingly, it should be appreciated that the aforementioned pre-processor processing simplifies post-processor processing by providing aligned data. Thus, aligned read access to multiple list words at any starting location in a virtual memory space mapped to multiple locations in physical address space. Moreover, though BRAM is described as used herein, distributed memory function, such as CLBs configured as distributed RAM, may be used. Moreover, other memory units, other than memory blocks, may be concatenated and used as described herein.

Figure 6:
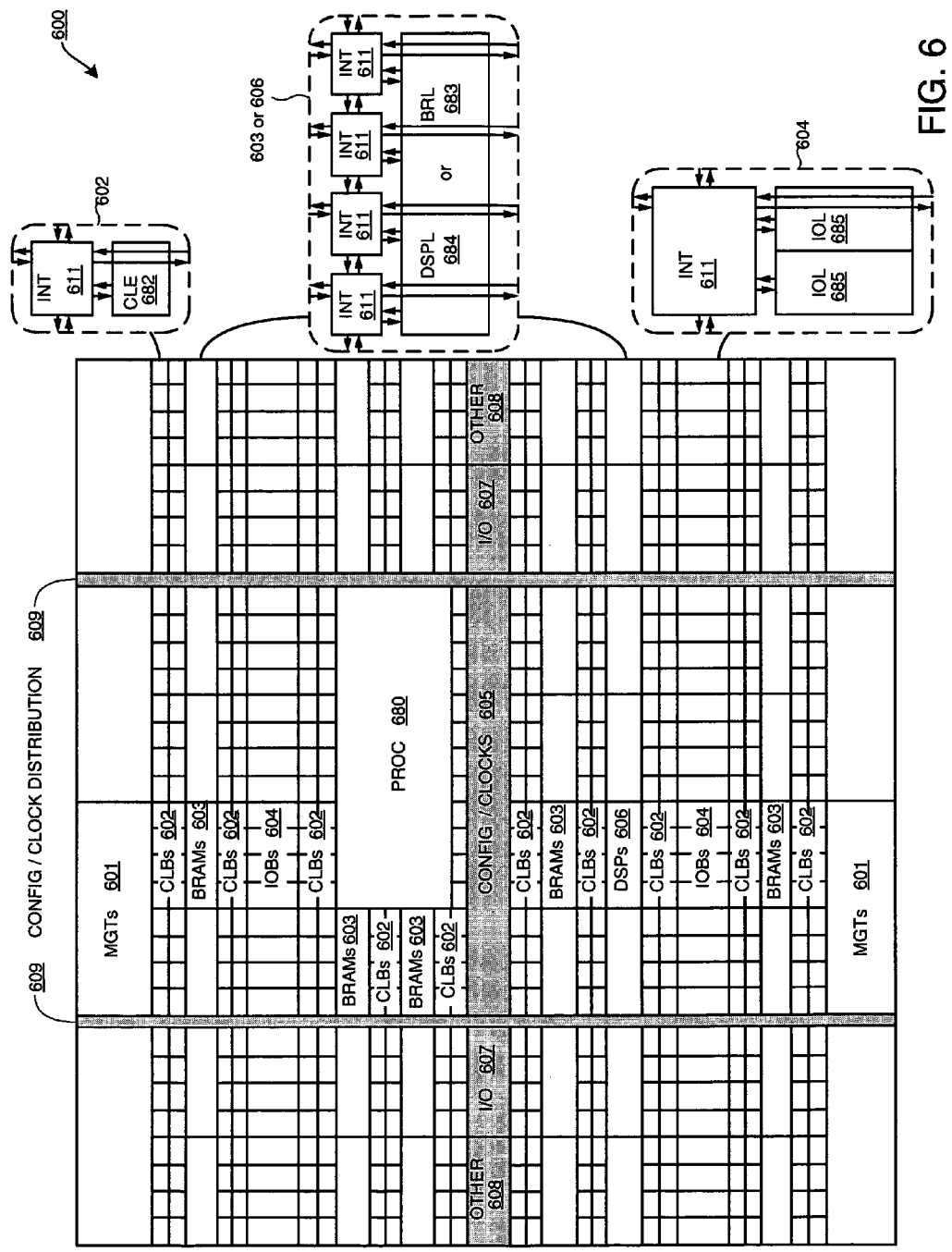
FIG. 6 is a high-level block diagram depicting an exemplary embodiment of a field programmable gate array architecture including different programmable tiles.

FIG. 6 illustrates an FPGA architecture 600 that includes a large number of different programmable tiles including multi-gigabit transceivers ("MGTs") 601, configurable logic blocks ("CLBs") 602, random access memory blocks ("BRAMs") 603, input/output blocks ("IOBs") 604, configuration and clocking logic ("CONFIG/CLOCKS") 605, digital signal processing blocks ("DSPs") 606, specialized input/output ports ("I/O") 607 (e.g., configuration ports and clock ports), and other programmable logic 608 such as digital clock managers, analog-to-digital converters, system monitoring logic, and so forth. Some FPGAs also include dedicated processor blocks ("PROC") 680. FPGA 600 may be used to implement system 100 of FIG. 1A.

In some FPGAs, each programmable tile includes a programmable interconnect element ("INT") 611 having standardized connections to and from a corresponding interconnect element in each adjacent tile. Therefore, the programmable interconnect elements taken together implement the programmable interconnect structure for the illustrated FPGA. The programmable interconnect element 611 also includes the connections to and from the programmable logic element within the same tile, as shown by the examples included at the right of FIG. 1A.

For example, a CLB 602 can include a configurable logic element ("CLE") 682 that can be programmed to implement user logic plus a single programmable interconnect element 611. A BRAM 603 can include a BRAM logic element ("BRL") 683 in addition to one or more programmable interconnect elements 611. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic element ("DSPL") 684 in addition to an appropriate number of programmable interconnect elements 611. An IOB 604 can include, for example, two instances of an input/output logic element ("IOL") 685 in addition to one instance of the programmable interconnect element 611. As will be clear to those of skill in the art, the actual I/O pads connected, for example, to the I/O logic element 685 are manufactured using metal layered above the various illustrated logic blocks, and typically are not confined to the area of the I/O logic element 685.

In the pictured embodiment, a columnar area near the center of the die (shown shaded in FIG. 6) is used for configuration, I/O, clock, and other control logic. Vertical areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block 680 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic. Additional details regarding a columnar architected FPGA may be found in a patent application, namely, U.S. patent application Ser. No. 10/683,944 entitled, "Columnar Architecture" by Steve P. Young, filed Oct. 10, 2003, now U.S. Pat. No. 7,187,200.

FPGA 600 illustratively represents a columnar architecture, though FPGAs of other architectures, such as ring architectures for example, may be used.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for queuing and ordering data, comprising:
receiving a set of bits at a first data rate;
interrogating the set of bits at a second data rate slower than the first data rate, the set of bits interrogated to obtain data information for the set of bits;
generating physical addresses for storing data obtained from the set of bits;
storing the data from the set of bits in memory responsive to the physical addresses, the storing including writing multiple words during a write operation;
creating a record of the data information for the set of bits, the record including a virtual address associated with a starting location of the physical addresses;
retrieving the record to read the data stored in the memory;
translating the record to provide the physical addresses for accessing the data stored in the memory and to provide select signals;
reading the data stored in the memory responsive to the physical addresses provided from translating the record; and
aligning the data accessed from the memory, the data aligned responsive to the select signals.

2. The method according to claim 1, wherein each set of the multiple words is written to multiple blocks of the memory, the multiple blocks concatenated to provide a physical address space for the physical addresses.

3. The method according to claim 2, wherein the starting location includes a physical address and a slot index, the physical address indicating a row in the memory where a first word of the set of bits is stored, and the slot index indicating in which of the multiple blocks the first word is stored.

4. The method according to claim 3, wherein the memory includes distributed memory.

5. The method according to claim 3, wherein the memory includes block random access memories of a programmable logic device.

6. The method according to claim 5, wherein the programmable logic device is a Field Programmable Gate Array.

7. The method according to claim 3, wherein the set of bits is selected from a packet, a frame, a sub-packet, and a sub-frame.

8. The method according to claim 3, wherein the first data rate is a double-data rate.

9. The method according to claim 8, further comprising converting the data from a serial stream into parallel streams for processing of the data at the second data rate.

10. The method according to claim 3, wherein the translating includes:
generating a load signal to load the physical addresses associated with the set of bits, the load signal and the physical addresses generated responsive to the virtual address;
using the slot index of the virtual address to provide a select signal of the select signals to select a lane zero for the aligning of the data; and
generating the select signals remaining in successive order from the select signal.

11. The method according to claim 10, wherein the record includes size of the set of bits.

12. The method according to claim 10, wherein the record includes an ending location of the physical addresses.

13. The method according to claim 10, wherein the translating includes generating an increment signal to increment the physical addresses responsive to size of the set of bits being greater than width of the row of the memory.

14. An integrated circuit for queuing and ordering data, comprising:
a serializer-deserializer configured to receive a serial stream of information at a first data rate and configured to convert the serial stream of information to parallel streams of information at a second data rate slower than the first data rate;
a pre-processor coupled to receive the parallel streams of information and configured to interrogate the parallel streams of information to locate an initial data word of a set of bits and to obtain information on size of the set of bits, the pre-processor configured to generate a physical address responsive to the initial data word location and to generate a virtual address responsive to the physical address and a slot index, the slot index indicating an memory unit in which the initial data word is to be stored;
a memory coupled to receive the parallel streams of information and the physical address associated therewith for storage of data for the set of bits, the memory including concatenated memory blocks, the physical address associated with the memory unit being a respective one of the concatenated memory blocks;
a pointer circuit coupled to receive the virtual address and the information on size of the set of bits from the pre-processor and configured to create record thereof, the virtual address for the initial data word associated with a row of the concatenated memory blocks;

a translator coupled to retrieve the record, the translator configured to generate physical addresses responsive to the virtual address and the information on size of the set of bits obtained from the record retrieved, the translator configured to generate select signals associated with the concatenated memory blocks responsive to the slot index and successive increments thereof responsive to the information on size of the set of bits; and an aligner coupled to receive the data for the set of bits read from the memory responsive to the physical addresses and coupled to receive the select signals, the aligner configured to provide lane alignment of the data for the set of bits read responsive to the select signals.

15. The integrated circuit according to claim 14, wherein the information on size of the set of bits is a set size, and wherein the translator is configured to increment the physical address responsive to the set size being greater than width of the concatenated memory blocks.

16. The integrated circuit according to claim 15, wherein the memory blocks are block random access memories of a programmable logic device.

17. The integrated circuit according to claim 14, wherein the programmable logic device is a Field Programmable Gate Array.

18. An integrated circuit for aligning data, comprising:

memories, each of the memories having a respective set of data out ports;

an aligner having multiplexers arranged in a lane sequence, the multiplexers coupled to each set of the data out ports of the memories to receive at least one data word from each of the memories, the at least one data word from each of the memories being associated with a cell having data words;

a virtual-to-physical address translator coupled to the memories and to the aligner, the virtual-to-physical address translator configured to translate a virtual address to provide physical addresses and select signals, the physical addresses being locations of at least a portion of the data words of the cell stored in the memories in successive order, the virtual-to-physical address translator configured to generate the select signals responsive to a memory index in the virtual address, the memory index associated with a memory of the memories having stored therein a first data word of the data words of the cell, the virtual address including a physical address of the first data word of the cell stored in the memory; and the multiplexers coupled to receive the select signals as control select signaling to align the at least one data word obtained from each of the memories for lane aligned output from the aligner;

wherein the first data word is output from a multiplexer of the multiplexers associated with an initial lane of the lane sequence.

19. The integrated circuit according to claim 18, wherein memories are block random access memories of a programmable logic device.

20. The integrated circuit according to claim 19, wherein the programmable logic device is a Field Programmable Gate Array.

* * * * *